United States Patent
Jones et al.

(10) Patent No.: US 7,355,992 B2
(45) Date of Patent: *Apr. 8, 2008

(54) RELAY FOR EXTENDED RANGE POINT-TO-POINT WIRELESS PACKETIZED DATA COMMUNICATION SYSTEM

(75) Inventors: David Victor Jones, Palm Bay, FL (US); Warren Todd Wilson, Malabar, FL (US); Raymond J. Kolar, Grant, FL (US)

(73) Assignee: Harris Corporation, Melbourne, FL (US)

( * ) Notice: Subject to any disclaimer, the term of this patent is extended or adjusted under 35 U.S.C. 154(b) by 965 days.

This patent is subject to a terminal disclaimer.

(21) Appl. No.: 10/629,449

(22) Filed: Jul. 29, 2003

(65) Prior Publication Data
US 2004/0184442 A1 Sep. 23, 2004

Related U.S. Application Data

(63) Continuation-in-part of application No. 10/391,467, filed on Mar. 18, 2003.

(51) Int. Cl.
*H04B 7/14* (2006.01)
*H04J 1/10* (2006.01)
*H04J 3/08* (2006.01)

(52) U.S. Cl. .................. 370/315; 370/310.2; 370/319; 370/320; 370/321; 370/338; 370/352; 370/357; 370/443; 370/463; 455/422.1; 455/452.2; 455/466

(58) Field of Classification Search ................ 370/315, 370/310.2, 319–321, 338, 352–357, 443–463; 455/422.1, 452.2, 466; 714/748–751; 709/208–209, 709/230–237
See application file for complete search history.

(56) References Cited

U.S. PATENT DOCUMENTS

| | | | |
|---|---|---|---|
| 4,251,865 A * | 2/1981 | Moore et al. | 710/109 |
| 4,774,707 A | 9/1988 | Raychaudhuri | 370/95 |
| 5,012,469 A | 4/1991 | Sardana | 370/95.3 |
| 5,231,634 A | 7/1993 | Giles et al. | 370/95.1 |
| 5,436,905 A | 7/1995 | Li et al. | 370/95.2 |
| 5,881,064 A * | 3/1999 | Lin et al. | 370/389 |
| 6,040,786 A * | 3/2000 | Fujioka | 340/928 |
| 6,349,210 B1 | 2/2002 | Li | 455/450 |
| 6,934,511 B1 * | 8/2005 | Lovinggood et al. | 455/11.1 |
| 7,200,130 B2 * | 4/2007 | Forstadius et al. | 370/338 |
| 2002/0172218 A1 * | 11/2002 | Harrison | 370/449 |

* cited by examiner

*Primary Examiner*—Steve M. D'Agosta
(74) *Attorney, Agent, or Firm*—Allen, Dyer, Dopplet, Milbrath & Gilchrist, P.A.

(57) ABSTRACT

A limited acknowledgement-based communication methodology increases the throughput efficiency of a relay-based, extended range, wireless packetized data transmissions to a data-reception site from a data-sourcing site, geographically remote with respect to the data-reception site. Rather than return an acknowledgement for each received packet, the data-reception site returns an acknowledgement only after receipt of a group of packets. When returning an acknowledgement, the data-reception site identifies which packets of the group were not successfully received. Missing packets may be retransmitted by the data-sourcing transmitter either immediately, or in response to a subsequent poll.

16 Claims, 10 Drawing Sheets

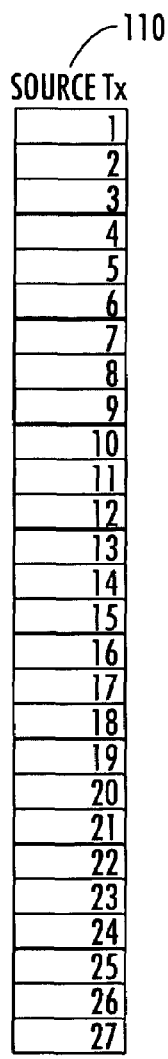
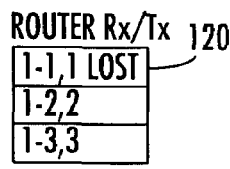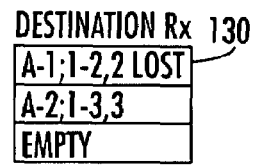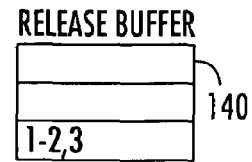
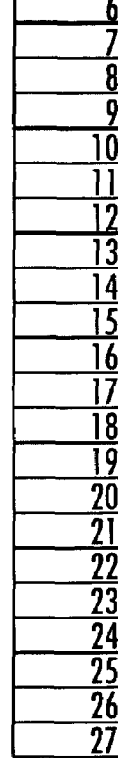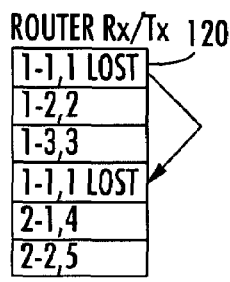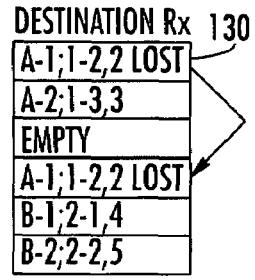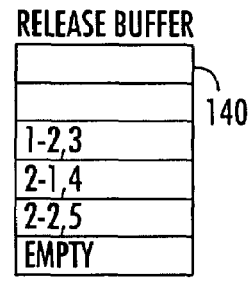
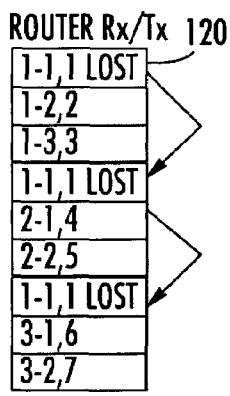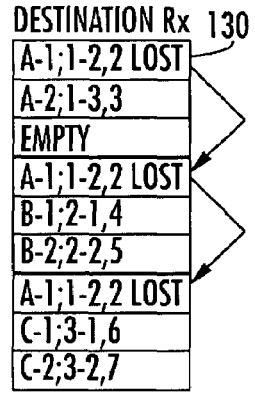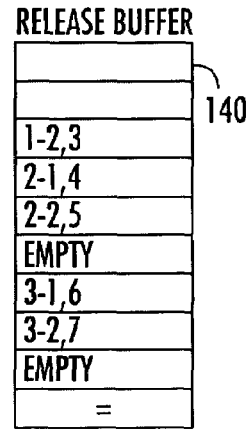
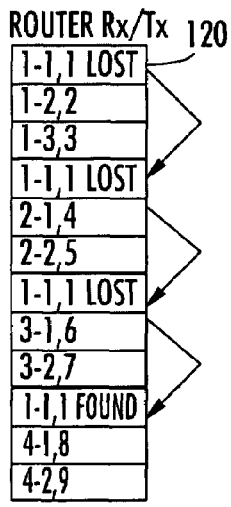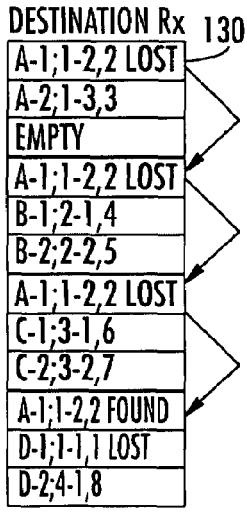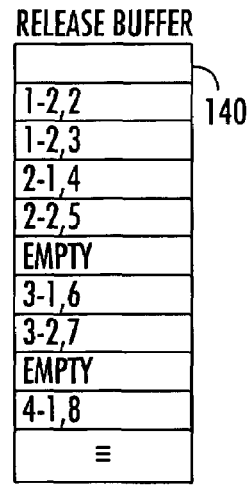

FIG. 25

ROUTER Rx/Tx 120

| 1-1,1 LOST |
| 1-2,2 |
| 1-3,3 |
| 1-1,1 LOST |
| 2-1,4 |
| 2-2,5 |
| 1-1,1 LOST |
| 3-1,6 |
| 3-2,7 |
| 1-1,1 FOUND |
| 4-1,8 |
| 4-2,9 |
| 5-1,10 |
| 5-2,11 |
| 5-3,12 |

FIG. 26

DESTINATION Rx 130

| A-1;1-2,2 LOST |
| A-2;1-3,3 |
| EMPTY |
| A-1;1-2,2 LOST |
| B-1;2-1,4 |
| B-2;2-2,5 |
| A-1;1-2,2 LOST |
| C-1;3-1,6 |
| C-2;3-2,7 |
| A-1;1-2,2 FOUND |
| D-1;1-1,1 LOST |
| D-2;4-1,8 |
| D-1;1-1,1 LOST |
| A-1;4-2,9 |
| A-2;5-1,10 |

FIG. 27

REASSEMBLY BUFFER 140

| 1-2,2 |
| 1-2,3 |
| 2-1,4 |
| 2-2,5 |
| EMPTY |
| 3-1,6 |
| 3-2,7 |
| EMPTY |
| EMPTY |
| 4-1,8 |
| 4-2,9 |
| 5-1,10 |
| |

FIG. 28

ROUTER Rx/Tx 120

| 1-1,1 LOST |
| 1-2,2 |
| 1-3,3 |
| 1-1,1 LOST |
| 2-1,4 |
| 2-2,5 |
| 1-1,1 LOST |
| 3-1,6 |
| 3-2,7 |
| 1-1,1 FOUND |
| 4-1,8 |
| 4-2,9 |
| 5-1,10 |
| 5-2,11 |
| 5-3,12 |
| 6-1,13 |
| 6-2,14 |
| 6-3,15 |

FIG. 29

DESTINATION Rx 130

| A-1;1-2,2 LOST |
| A-2;1-3,3 |
| EMPTY |
| A-1;1-2,2 LOST |
| B-1;2-1,4 |
| B-2;2-2,5 |
| A-1;1-2,2 LOST |
| C-1;3-1,6 |
| C-2;3-2,7 |
| A-1;1-2,2 FOUND |
| D-1;1-1,1 LOST |
| D-2;4-1,8 |
| D-1;1-1,1 LOST |
| A-1;4-2,9 |
| A-2;5-1,10 |
| D-1;1-1,1 LOST |
| B-1;5-2,11 |
| B-2;5-3,12 |

FIG. 30

REASSEMBLY BUFFER 140

| 1-2,2 |
| 1-2,3 |
| 2-1,4 |
| 2-2,5 |
| EMPTY |
| 3-1,6 |
| 3-2,7 |
| EMPTY |
| EMPTY |
| 4-1,8 |
| 4-2,9 |
| 5-1,10 |
| 5-2,11 |
| 5-3,12 |
| ≡ |

RELAY FOR EXTENDED RANGE POINT-TO-POINT WIRELESS PACKETIZED DATA COMMUNICATION SYSTEM

CROSS-REFERENCE TO RELATED APPLICATION

The present application is a continuation-in-part of co-pending U.S. patent application Ser. No. 10/391,467, filed Mar. 18, 2003, by D. Jones et al, entitled: "Extended Range Wireless Packetized Data Communication System" (hereinafter referred to as the '467 application), assigned to the assignee of the present application and the disclosure of which is incorporated herein.

FIELD OF THE INVENTION

The present invention relates in general to communication systems and subsystems therefor, and is particularly directed to a relay mechanism for a wireless packetized communication system of the type disclosed in the above-referenced '467 application. In that system enhanced throughput efficiency, wireless packetized data transport is provided by way of a limited acknowledged-based, communication path linking a data-reception site and a data-sourcing wireless transceiver site that is geographically remote relative to the data-reception site. The relay mechanism of the present invention serves to maximize throughput at each of one or more successive relay nodes interposed between the data-sourcing site and the data-reception site of such as system.

BACKGROUND OF THE INVENTION

The communications industry has developed a number of efficient throughput, wireless packet-based communication methodologies or protocols (such as IEEE standard 802.11a internet protocol) that are intended for use within an office or intra-building environment, where transmission distances are relatively short (e.g., on the order of one to several hundred feet). While these protocols work reasonably well for 'nested' or 'quasi-nested' local area networks (LANs), they are not readily suited for use with extended range applications (e.g., on the order of several tens of miles or more).

This latter type of environment suffers from the problem diagrammatically illustrated in FIG. 1, specifically the substantial transport delay that results from having to return an acknowledgement (ACK or NACK) transmission for each successively transmitted packet. (For example, the MAC acknowledgement layer of the above-referenced 802.11a protocol returns an ACK for each packet.) This problem is particularly noticeable in networks containing a large number of transmitters that must communicate over large distances with a reception/processing or relay site.

In accordance with the invention detailed in the above-referenced '467 application, this problem is effectively obviated by providing a limited acknowledgement-based wireless communication methodology that substantially increases the transport efficiency of packetized data transmissions to a 'master' data-reception site from a 'slave' data-sourcing or transmission site, geographically remote relative to the data-reception site. Rather than requiring the master receiver to return an acknowledgement message in reply to each packet received by an interrogated transmitter, the invention of the '467 application returns an acknowledgement only upon receipt of a plurality or group of packets, the number of which is known by the master and the slave.

When returning an acknowledgement message, the master identifies which, if any, packets of the group were not successfully received. These missing packets are then retransmitted by the slave transmitter in a manner dictated by the master, either immediately, or in response to a subsequent poll of that site by the data recipient. When retransmitted, the missing packets of the previous transmission are prepended to any new packets awaiting transmission.

FIG. 2 diagrammatically illustrates a simplified, non-limiting example of a geographically dispersed wireless communication system with which the invention disclosed in the '467 application may be employed. As shown therein, a plurality of transmitter sites 10-1, 10-2, 10-3, ..., 10-N are dispersed over a prescribed data-gathering region, and are geographically remote relative to a data-recipient and processing site 20. By the phrase 'geographically remote' is meant a considerable wireless transmission distance (e.g., on the order of several to multiple tens of miles) relative to separations between the transmitter sites (which may be, but are not limited to, on the order of several to more than tens of feet apart).

Disposed at each transmitter site is an information source, shown as transducers 12-1, 12-2, 12-3, ..., 12-N, which are respectively coupled to associated wireless transceiver units 13-1, 13-2, 13-3, ..., 13-N. As a non-limiting example, the transducers may correspond to motion sensors, such as but not limited to acoustic transducers (e.g., geophones), optical sensors (e.g., infrared detectors), and the like, which are interfaced with supervisory and monitoring controllers 14-1, 14-2, 14-3, ..., 14-N of their associated wireless transceiver units. The transceivers employed at the remote sites 10 and associated transceivers at the data-recipient site 20 may comprise conventional wireless transceiver units, such as those which are capable of operating at a data transport rate of 500 kbps or greater.

The remote site transceivers 13 serve as slave transmitter units, and are selectively polled by their associated master transceivers 21, which are interfaced with an associated data processing station 22, that may be co-located with the master transceivers or located at a separate facility. Alternatively, data-recipient site 20 may employ a single master transceiver that is operative to poll and collect information from the various slave transceivers at the remote sites. Communications between a slave transceiver and a master transceiver are performed as poll-acknowledgement communications, and may comprise system-associated communications, status-associated communications and data communications.

FIG. 3 diagrammatically illustrates the packet-handling architecture of a respective one of the remote site located, slave transceiver units 13, that implements the interrogated or polled transmitter portion of the wireless packetized communication mechanism of the '467 application. As shown therein, a slave transceiver includes an output buffer 301, which stores a group or plurality of packets intended for transmission to the data-recipient site. As a non-limiting example, a packet may be one kilobyte in length, and a packet group may comprise 150 packets, to realize a group size of 150 kbytes. Each packet contains a header field and a data field. The header field contains configuration parameters as well as variables used to process and control handling of the packet. The data field includes data to be transmitted, as may be derived from the transceiver's associated transducer. An input/output buffer 302 receives an interrogation packet (or Poll) from the data-recipient site.

Pursuant to the invention detailed in the '467 application, whenever an acknowledgement message is returned to a transmitter by the data-recipient transceiver, it identifies which packets of the group that were previously transmitted, if any, had not been successfully received. Rather than retransmit the entire group of packets, the interrogated transmitter transmits only the missing packets. For this purpose, the transmitter contains a resend buffer 303 and an associated resend matrix 304. The resend buffer 303 has a storage capacity of one group. It should be noted that the loss of all packets results in a retransmission of all the packets (Resend All). In such an instance, nothing is loaded in the resend buffer. The transmission of data is limited to one group of data, so that the largest number of Resends will be a group size of data. Since only a group amount of data packets can be sent in a single transmission sequence, then the largest amount of possible Resends is a group sized amount of packets.

The resend matrix 304 is shown as comprising a dual or ping-pong buffer that stores the identification of packets that were not received by the data-recipient transceiver during a previous transmission, as identified in the acknowledge message. Each packet identification (PID) is associated with an index to a packet in the resend buffer. Being configured as a ping-pong buffer enables the resend matrix to accommodate the identification of both missing packets of a previously transmitted group, as well as the identification of any packets missing from the new group.

FIG. 4 diagrammatically illustrates the packet-handling architecture of the data-recipient transceiver 21 to implement the receiver portion of the wireless packetized communication mechanism of the '467 application. As shown therein, the data recipient receiver includes an input or receive buffer 401, which stores all incoming data, and is sized to accommodate multiple groups of data being received from a transmitter site as it is selectively polled by a data-recipient transceiver. A respective one of the group sections of the receive buffer 401 includes a data buffer 402 and an associated resend matrix 403. Data buffer 402 has a storage capacity sufficient to accommodate the currently configured number of packets that make up a single group.

The header portion of each packet (which may contain configuration parameters and member variables as shown at 404) is not stored in the data buffer, but is processed at the reception of the packets. The resend matrix 403 stores the identification of any missing packets of a received group. In addition to handling incoming packet group transmissions, the receiver further includes a status buffer 405, which is a single packet in length and is used to store either status or System (dependent upon the requested type) information separate from received data. An output packet buffer 406 stores the contents of outgoing packets intended for the transmitter site.

FIG. 5 shows the manner in which the Improved Datagram Protocol or IDP packetized data transport mechanism of the '467 application may be interfaced with a standard, layered-protocol communication scheme. In particular, FIG. 5 shows the placement of an Improved Datagram Protocol or IDP layer 52 intermediate the application layer 51, which interfaces data, such as that from the transducers 12, and a user datagram protocol (UDP) transport layer 53. The UDP layer 52 is encapsulated on an internet protocol (IP) network layer 54, which is encapsulated on a data link layer comprised of an Ethernet 802.3 layer 55 or an 802.11 MAC layer 56. The physical layer corresponds to PHY layer 57.

Similarly, at the receiver (data-recipient site 20), an IDP layer 62 is interfaced with the application layer 61, which interfaces received sensor data to a downstream processing operator, and a UDP transport layer 63. The UDP layer 63 is encapsulated on an internet protocol (IP) network layer 64 which, in turn, is encapsulated on a data link layer comprised of an Ethernet 802.3 layer 65 or an 802.11 MAC layer 66. Again, the physical layer 67 corresponds to a PHY layer.

As pointed out briefly above, communications between a slave transceiver and a master transceiver may comprise system-associated communications, status-associated communications and data communications. The manner in which extended range, data communications are carried out for bulk data transport may be understood by reference to FIG. 6, which shows a data communication sequence that is conducted between a remote transmitter at a data sourcing site and a receiver at the data-recipient site.

In particular, FIG. 6 is a bulk data pipe flow diagram of a data communication sequence between a data transmitter and the data-recipient is initiated by an interrogation or polling message in the form of a Data-Poll packet 601 that is transmitted from the data recipient to a specifically polled transmitter. At the polled transmitter, the contents of the Data-Poll packet are captured in the transmitter's input/output buffer 302 for processing by the transceiver's communications controller. In response to the Data-Poll, the transmitter returns a poll acknowledgement message in the form of a Data Poll-Ack packet 602, which indicates the total number of packets currently awaiting transmission in transmit buffer 301. The receiver already has knowledge of any additional (missed or Resend) packets that are awaiting transmission in the. transmitter's resend buffer 303 for a previous poll, since it will have identified those packets in a previous data transmission sequence associated with that poll. In may be assumed that there are no missing packets currently awaiting transmission. If Resend data did exist, it would be transmitted from the Resend buffer 303.

In response to the Data Poll-Ack packet 602, the receiver forwards a Data-Request packet 603 to the transmitter, the Data-Request packet indicating to the transmitter to send a group size of data. Namely, The Data-Request packet 603 only requests data, it does not indicate how many bytes are to be sent. The largest amount of data during a data transport message is the maximum capacity of a group of packets which, in the present example, is 150 packets (one kbyte each) corresponding to 150 kbytes. In response to the Data-Request packet 603, the transmitter transmits a group of data packets as a Data message 604 to the receiver.

At the data-recipient receiver, the data fields of the received group of packets are captured in the group's data buffer 302, while their header fields are processed. If any packets were not successfully received, they are tagged as such in the receiver's group specific resend matrix 303. The receiver then returns a data acknowledgement (Data-Ack) packet 605 to the transmitter. The header portion of the Data-Ack packet is used to indicate whether all of the data packets were received without error, or if one or more packets need to be retransmitted. If any packets need to be retransmitted, they are identified by encapsulating the PIDs of the Resend packets (as identified in the current unfilled groups resend matrix) in the data field of the Data-Ack packet 605.

A request to resend data may either identify which packets are to be resent or indicate that all packets with the exception of specifically enumerated packets are to be resent. The latter mechanism employs an error percentage configurable parameter (field) which identifies the percentage of packets that must be lost or failed to have been received in order to declare a catastrophic failure. The (Resend-All exception for any found Resend packets) capability is a configurable ON/OFF state parameter. If ON, then the Resends found are identified and are not to be resent. If OFF, then all the data is resent.

The header field of the Data-Ack packet 605 contains a Retransmit bit. The logical state of the Retransmit bit indicates whether the identified missing packets are to be immediately retransmitted, so as to effectively maintain an ongoing or 'continuing' transmission from the transmitter to the receiver, based upon a configurable percentage of valid data received in the last data communication sequence, or whether the transmitter is to wait for a further Data Poll packet from the receiver before retransmitting the missing packets). If the Retransmit bit is set (e.g., to a logical '1'), the transmitter immediately proceeds to transmit the next group of data packets to the receiver as it did in response to Send-Data packet 603, described above. As an alternative option, the transmitter may be placed in a "Waiting for Data Request" state. In this mode the receiver sends a Data request immediately following the data-ACK. In addition, this next group of packets is prepended with the requested missing packets. If the Retransmit bit is not asserted (e.g., a logical '0'), the transmitter must wait until the next Data Poll before transmitting.

The continuing data is a configurable parameter. It may be turned ON or OFF. When turned ON, the receiver knows how many packets are available at the transmitter from the previous Data Poll_ACK 602, so that the receiver can determine the maximum number of possible groups that can be obtained. This is readily accomplished by dividing the packets with the group size to determine the maximum number of groups available. The receiver therefore knows how many times to request data. The number of attempts may also be configurable, so that the receiver will selected the lesser of the two. The data must also be received within a certain percentage of error. The Continuing Data Percentage parameter is a configurable parameter and corresponds to the percentage of packets that must be received in order to allow continuing transmission.

In response to a Data Ack, the system begins preparation for the next data transmission, and the transmitter eliminates from the transmit buffer all packets that were not requested In the Data-Ack packet, and moves the packets that were identified as missing in the Data-Ack packet to the transmitter's resend buffer. The DATA_ACK packets are then processed through the Resend Matrix. Any packets that were not identified in the DATA_ACK packet 605, but were originally in the Resend Matrix are assumed to be found packets by the receiver. The index associated with each is then used to clear that packet from the Resend Buffer 303. This frees up this packet of information for new Resend Packets. Any Resends that were not found will have their PIDs and associated indices to the Resend Buffer moved to the next matrix in the Resend Matrix 403. Any new Resends will be added to the new Matrix with the associated index to where they were moved in the Resend Buffer. On the next poll all resend packets are prepended to the front of the next group. Any packet space remaining is filled with new data packets. The requested missing packets are treated as a new group, but the original packet identifications are retained.

In the event of a further poll or continuing data transmission, the transmitter proceeds as described above, by transmitting the requested group of identified missing packets first (as that group of packets has been loaded in the front end of the new group) followed by any new groups of packets. In the present example, if there were 15 resends, then after a Poll, the transmitter would first transmit the 15 resends as identified in the Resend Matrix. The transmitter would then transmit 150−15=135 new packets from the transmit buffer, thus completing a full 150 group size transmission sequence. It may be noted that the new group is only 135 packets in size. If there were more resends, the most that could occur would be a group size or 150 in the present example.

As shown in the system sequence diagram of FIG. 7 (used for upper layer application-to-application communications), in addition to conducting data transport communications, the invention of the '467 application provides for the request of system and status information from the receiver to the transmitter. The status is a protocol status, corresponding to a request for information that is specific to the protocol (namely, configurable items, such as packet size). System communication provides for system-to-system communications between the transmitter-associated application and the receiver's associated application. Status is a Status Poll with a Status Poll_Ack. The Data portion of the Status Ack packet contains the requested status parameters.

As illustrated in FIG. 7, in response to a system request 701, the receiver transmits a system Poll packet (step 702) to the transmitter. In response to the system Poll, the transmitter forwards (step 703) the contents of the system request to the associated application, which then returns the requested system information to the transmitter in step 704. This system information constitutes payload data for a System Poll-Ack packet 705, which is returned to the receiver. The return of system information is a pass/fail operation, and is indicated to the attendant program at the receiver at step 706. If system data is not received within a configurable period of time, the request will return an error to the application. If system data is received, then the application is informed that it is available. It is the responsibility of the application to read the buffer, as shown at step 707.

In addition to data and system sequence communications, the communication scheme of the '467 application provides a status sequence to collect protocol parameterized data, as shown in the status pipe flow sequence of FIG. 8. In response to a request for status at step 801, the receiver forwards a status Poll packet in step 802 to the transmitter. The transmitter then responds with a status poll acknowledgement in step 803. A status available indication is provided at step 804, so that the status buffer may be read at step 805.

Now although the limited acknowledgement-based communication mechanism detailed in the '467, described above, is very effective in increasing the transport efficiency of packetized data transmissions to a 'master' data-reception site from a 'slave' data-sourcing or transmission site, it does so by direct or point-to-point communications between the master data-recipient site and a relatively remote slave transmitter site. There may be occasions, however, where such a direct communication path is impossible or impractical, mandating the use of one or more intervening or relay sites between the data-sourcing site (original transmitter) and the data-recipient site (destination receiver). In this event it is imperative that the data relay mechanism not create a 'bottleneck', something which might happen if a relay site were to await for receipt of all packets of each group from the transmitter before forwarding the data to the downstream receiver.

SUMMARY OF THE INVENTION

In accordance with the present invention, the limited acknowledgement based signal transport functionality employed by the communication system described in the above-referenced '467 application is modified for use in communication system that contains one or more relay sites interposed between an upstream-most data-sourcing site and a downstream-most data-recipient site. As will be described, each successive pair of transceivers distributed along the communication path through one or more relays between a transmitter site and a destination site exchange messages with one another using the data communication exchange protocol of FIG. 6, described above. The packet-handling architecture of the data-sourcing site is identical to that shown in FIG. 3, while the packet-handling architecture of the data-recipient site is substantially identical to that shown in FIG. 4. In addition, the data recipient site is augmented to include an additional data assembly buffer. This additional buffer is used to store and eventually release all successfully received data.

A relay site transceiver includes a receiver section for receiving data from the upstream data-source or an adjacent upstream relay and a transmitter section for transmitting data it has received via the receiver section to the downstream data-recipient site or an adjacent downstream relay. The receiver section of the relay includes a receive buffer, which is sized to accommodate multiple groups of data being received from an upstream source. The receive buffer is doubled to a ×2 capacity to account for group numbering across the system. A respective one of the group sections of the receive buffer includes a data buffer and an associated resend matrix. The data buffer has a storage capacity sufficient to accommodate the currently configured number of packets that make up a single group.

The header portion of each packet, is stored in the data buffer, and is processed at the reception of the packets. The original header must be transmitted and is used by the destination to process and recombine the original data. Each relay will append its own header. When a relay receives a relayed packet, it strips the sending relay's header and appends its own header, but the IDP header is not stripped. This enables the data to be reconstituted at the destination. The resend matrix stores the identification of any missing packets of a received group. In addition to handling incoming packet group transmissions, the receiver further includes a status buffer which is a single group in length and is used to store either status or system depending upon the requested type information separate from received data. An output packet buffer stores the contents of outgoing packets intended for the next upstream site.

Within its transmitter section the relay includes an output or transmit buffer which stores a group or plurality of packets intended for transmission to the next downstream (e.g., data-recipient) site. Each packet contains a relay header field that is appended to the IDP header field, which is prepended to the data field. The header field has configuration parameters as well as variables used to process and control handling of the packet. The data field includes data to be transmitted. An input/output buffer receives an interrogation packet or poll from a downstream site (e.g., the data-recipient site).

When an acknowledgement (ACK) message is returned by the device, it identifies which packets of the group that were previously transmitted, if any, had not been successfully received. Rather than transmit the entire group of packets, the interrogated transceiver transmits only the missing packets. For this purpose, the transmit section of the relay comprises a resend buffer and an associated resend matrix. The resend buffer has a storage capacity of one group. The loss of all packets results in a retransmission of all the packets (Resend All). In such an instance, nothing is loaded in the resend buffer. The transmission of data is limited to one group of data, so that the largest number of Resends will be a group size of data. Also, since only a group amount of data packets can be sent in a single transmission sequence, then the largest quantity of possible Resends is a group sized amount of packets.

As in the transceiver at the transmit site, the resend matrix of the relay's transmitter section comprises a dual or ping-pong buffer that stores the identification of packets that were not received by the downstream (data-recipient) transceiver during a previous transmission, as identified in the acknowledge message. Each packet identification (PID) is associated with an index to a packet in the resend buffer. Being configured as a ping-pong buffer allows the resend matrix to accommodate the identification of both missing packets of a previously transmitted group, as well as the identification of any packets missing from the new group.

In order to maximize throughput from the data-sourcing site and the data-reception site, the relay mechanism of the present invention executes the limited acknowledged-based data transport mechanism detailed in the '467 application in the context of successive pairs of communication transceivers along the communication link. As a non-limiting example, considering the reduced complexity system of a single relay, there are two pairs of associated transceivers that exchange data gathering messages with one another via the limited acknowledged-based data transport mechanism detailed in the '467 application, and a flow diagram of which is shown in FIG. 6. The first pair involves data request and transport messages between the data-sourcing site and the relay. The second pair involves data request and transport messages between the relay and the data reception site. In other words the system contains at least three communication units: 1) transmitter; 2) at least one relay; and 3) a receiver.

The operation of the relay-based system of the invention uses the same polling and acknowledgement scheme of the '467 application, but does so on an adjacent transceiver pair basis, wherein a polling message is selectively wirelessly transmitted from a downstream one of each pair of transceiver devices. In response to the polling message, the upstream device wirelessly transmits a poll acknowledgement message representative of whether that device has data to send and the quantity of data to be sent. In response to receipt of the poll acknowledgement message indicating that the queried device has data to send, the polling device transmits a data request message. In response to receipt of the data request message, the polled device transmits a data message containing a plurality of data packets.

In response to receipt of the data message at the data reception device, that device stored data contained in data packets of the data message, and stores information representative of any data packets missing from the data message. The polling device then transits a data acknowledgement message that includes information representative of any data packets missing from the data message, so that the polled device will retransmit only specifically identified packets and fill the remainder of the data message with new packets.

Because the relay-based architecture of the invention operates dynamically in terms of transceiver pairs along the relay path, it does not force a relay site to wait until it has received an entire set of contiguous packets before forwarding what it has received to the next downstream device. Packets are immediately forwarded along the (relayed) link as they are received and requested. Packets that are missing from a requested poll are indicated as such, and are forwarded as prepended packets to a further transmission, within a prescribed retry metric, once those packets have been received from an upstream source. Eventually, once the packet assembly buffer at the downstream-most destination site has received a contiguous string of packets, the transmission of which may have taken several retransmission intervals, it will release those packets.

In addition to a prescribed number of retries-based retransmission criteria, the present invention may optionally incorporate a time out mechanism. In accordance with this procedure a sequence number is appended to the header by the transmitter. The destination receiver (not an intervening relay) sets a timer for each new group it receives. If a group has not been completed (resends present) when the timer expires, the destination receiver will fill all remaining packets in the reassembly buffer as incomplete, and then release that portion of the reassembly buffer up to the next incomplete group in the buffer or the end of the buffer. The sequence number for each released group is then incremented. If a received packet has a sequence number lower than the current sequence number, that packet is ignored and discarded. In effect, since the packet will not be identified in the Data-Ack for the group, the sender will presumed it was received and it will be purged.

BRIEF DESCRIPTION OF THE DRAWINGS

FIG. 12 shows a source transmitter having packets awaiting transmission in response to a poll from a relay;

FIGS. 13-33 are transceiver/buffer content diagrams showing the manner in which packets propagate through the relay-based wireless packetized communication mechanism of FIG. 10.

DETAILED DESCRIPTION

Figure 1:
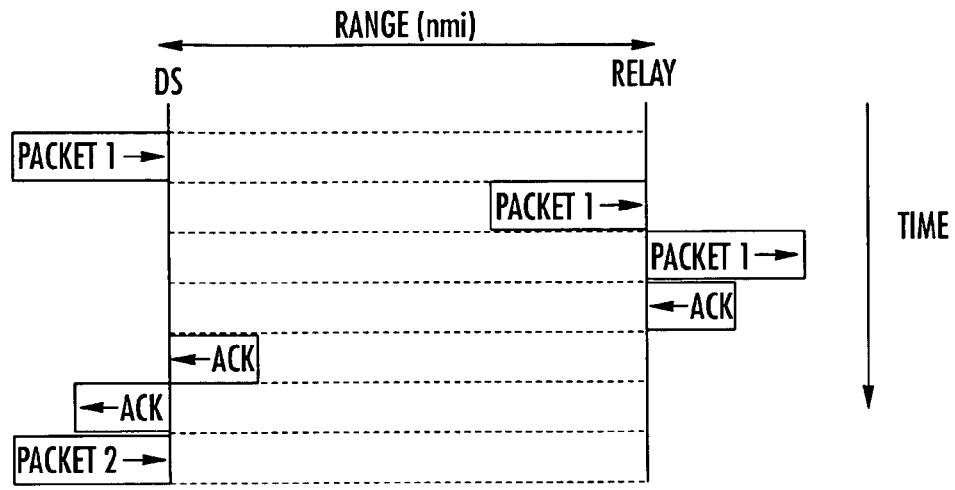
FIG. 1 diagrammatically illustrates the problem of transport delay associated with having to return an acknowledgement (ACK or NACK) transmission each of successively transmitted packets.

Before describing the relay-incorporating, extended range, wireless packetized data communication mechanism in accordance with the present invention, it should be observed that the invention resides primarily in what is effectively a prescribed augmentation of the architecture of the system disclosed in the above-referenced '467 application, to incorporate therein at least one relay, as well as the appropriate modification of control software employed by the micro-controllers of digital signaling and data-interface units of respective wireless transceivers located at geographically spaced apart data-sourcing and data-reception sites and the one or more relay sites therebetween.

As in the system of the '467 application, digital signaling and data interface units may comprise modular arrangements of conventional digital communication circuits and associated digital signal processing components and attendant supervisory control circuitry therefor, that controls the operations of such circuits and components. In a practical implementation that facilitates their incorporation into wireless communication equipment, these modular arrangements may be readily implemented as field programmable gate array (FPGA)-implemented, or application specific integrated circuit (ASIC) chip sets.

Consequently, the configuration of these units and the manner in which they are interfaced with other communication and transducer components have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 2:
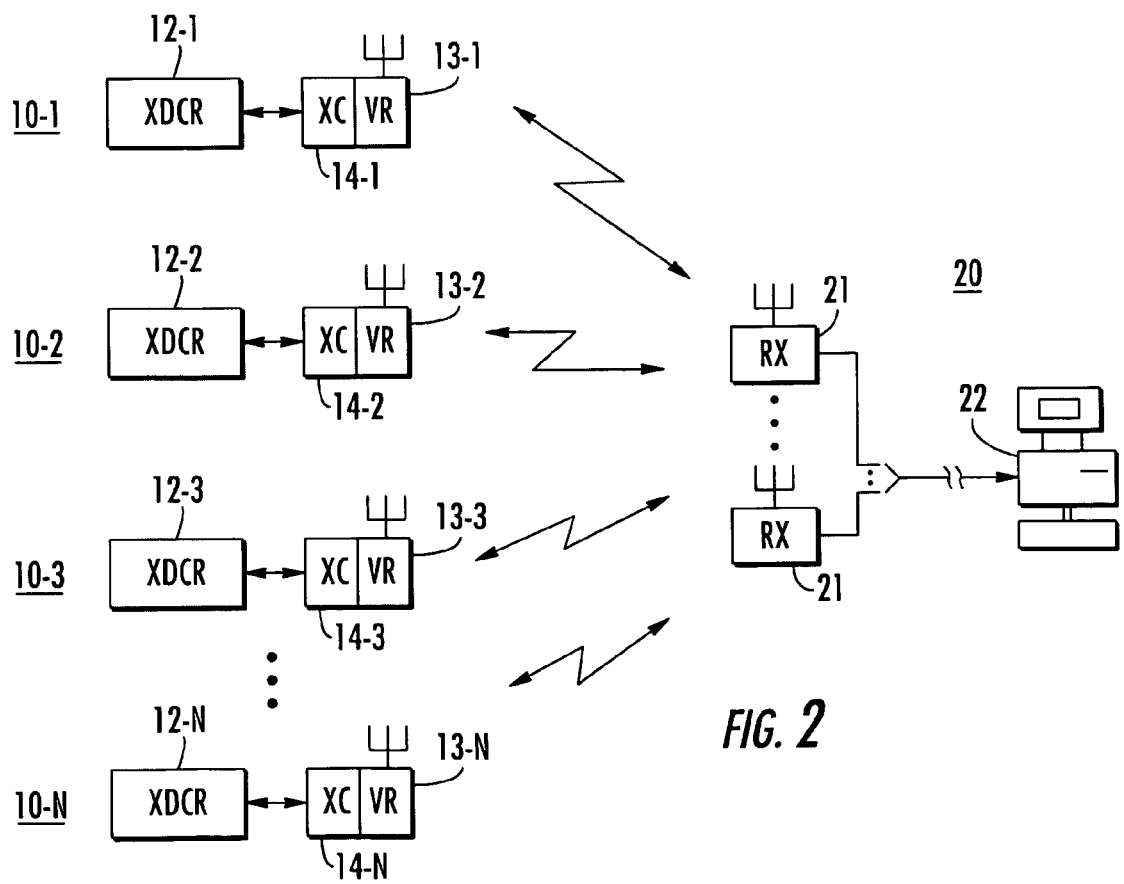
FIG. 2 diagrammatically illustrates a simplified example of a geographically dispersed wireless communication system in which the invention disclosed in the '467 application may be employed.
Figure 9:
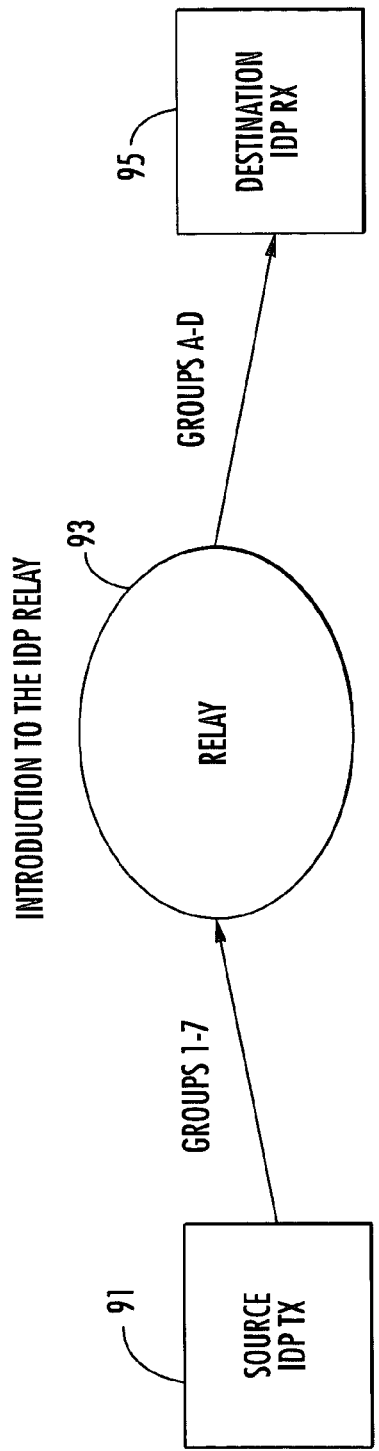
FIG. 9 diagrammatically illustrates a reduced complexity, non-limiting example of a geographically dispersed wireless communication system of the type shown in FIG. 2, having a relay site interposed in the communication path established between a data-sourcing transmitter site and a data-recipient destination site.

Attention is now directed to FIG. 9, which diagrammatically illustrates a reduced complexity, non-limiting example of a geographically dispersed wireless communication system of the type shown in FIG. 2, described above, but having a relay site 93 that is interposed in the communication path that is established between a data-sourcing transmitter site 91 and a data-recipient destination site 95. While only a single relay has been illustrated in order to reduce the complexity of the drawings, it should be observed that the invention is not limited to only one or any particular number of relay sites. The manner in which the invention is readily incorporated in a system having multiple relay sites as a part of a communication path between the source and destination sites will become readily apparent from the description below.

Figure 6:
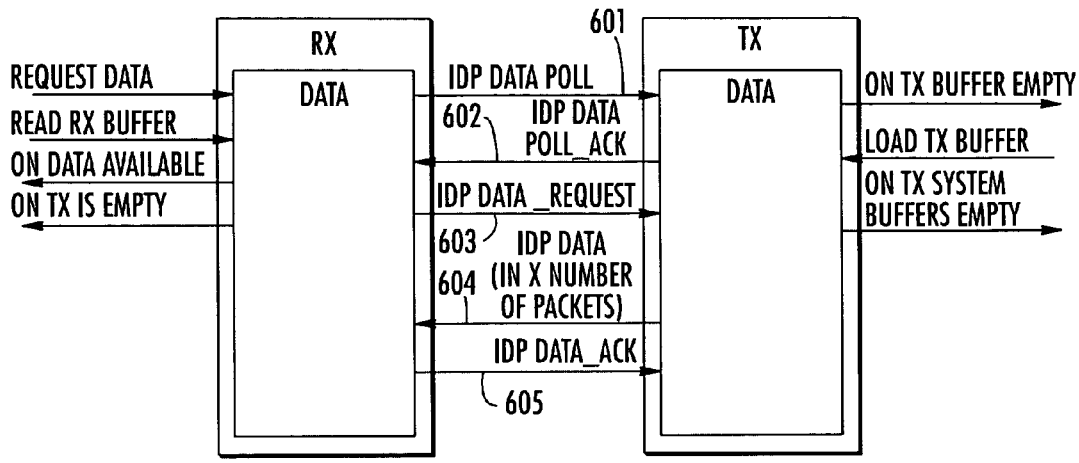
FIG. 6 shows a data communication sequence (wherein the data pipe is used for bulk data transmission) between a remote transmitter and a receiver at the data-recipient site using improved datagram protocol.
Figure 7:
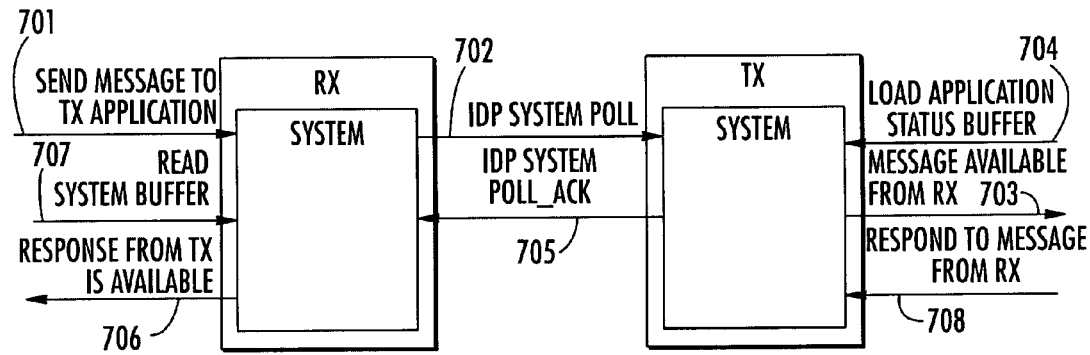
FIG. 7 shows a system communication sequence (wherein the system pipe is used for upper layer application-to-application communication) between a remote transmitter and a receiver at the data-recipient site.
Figure 8:
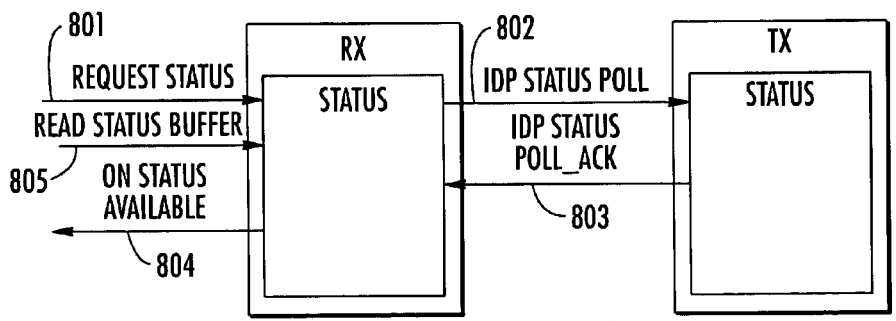
FIG. 8 shows a status communication sequence (wherein the status pipe is used for collection of protocol information from a respective IDP transmitter) between a remote transmitter and a receiver at the data-recipient site.

In the system of FIG. 9, each successive pair of transceivers that are distributed along the communication path through a single relay 95 between the source site 91 and the destination site 93 exchange messages with one another using the data communication exchange protocol of FIG. 6, described above. In the illustrated example, there are two sequential pairs of transceivers, comprised of a transceiver pair 91-95 and a transceiver pair 95-93. The remote transmitter site 91 and the data recipient site do not communication directly with one another; they communicate only with the relay 95. However, since the relay site 95 uses the same protocol of FIG. 6 for both upstream and downstream communications, its participation is effectively a seamless operation between the transmitter and destination sites, as will be fully understood from the description below.

Figure 3:
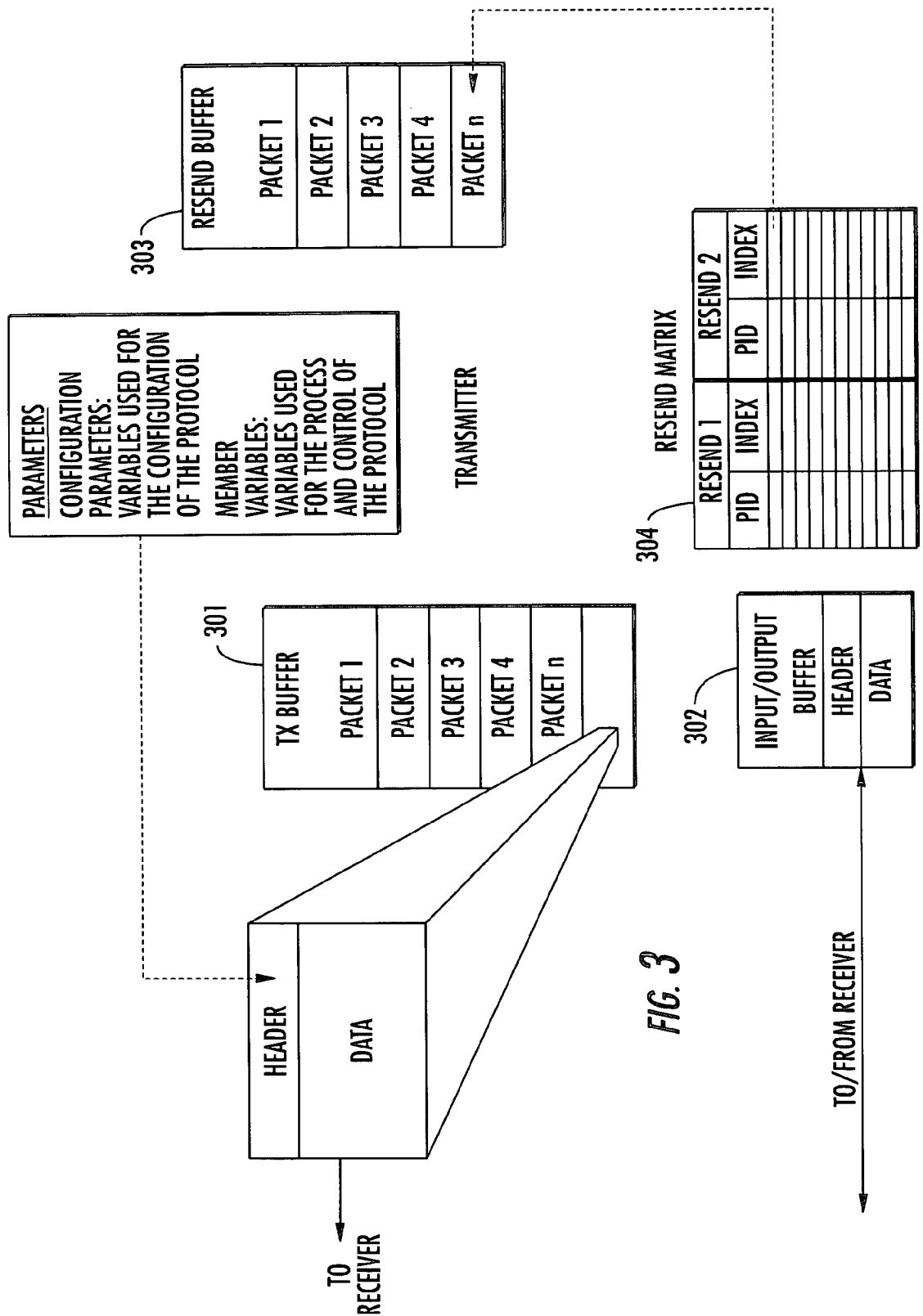
FIG. 3 diagrammatically illustrates a transmitter packet-handling architecture which implements the data-sourcing portion of the wireless packetized communication mechanism of the invention disclosed in the '467 application.
Figure 4:
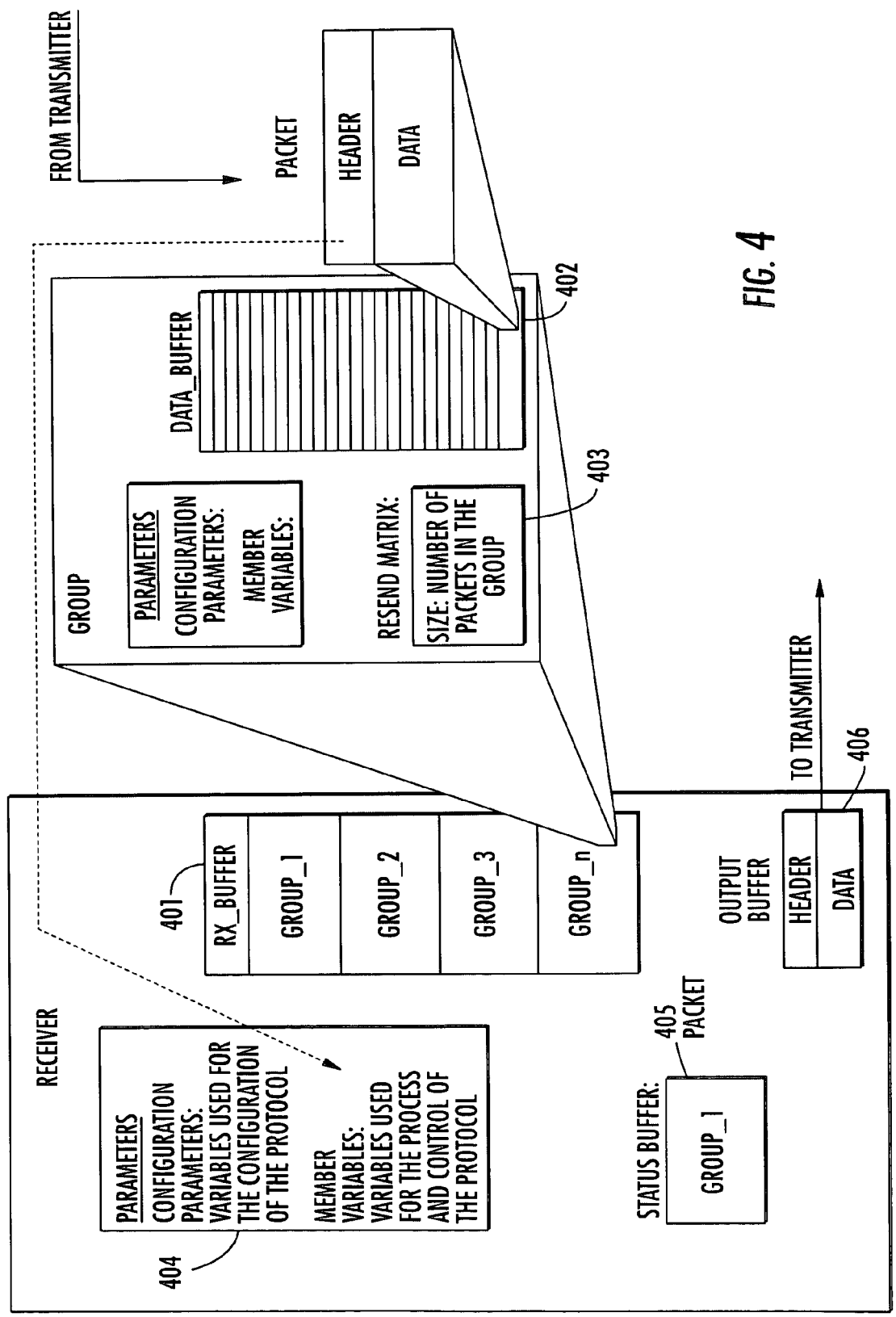
FIG. 4 diagrammatically illustrates a receiver packet-handling architecture which implements the data-recipient portion of the wireless packetized communication mechanism of the invention disclosed in the '467 application.
Figure 5:
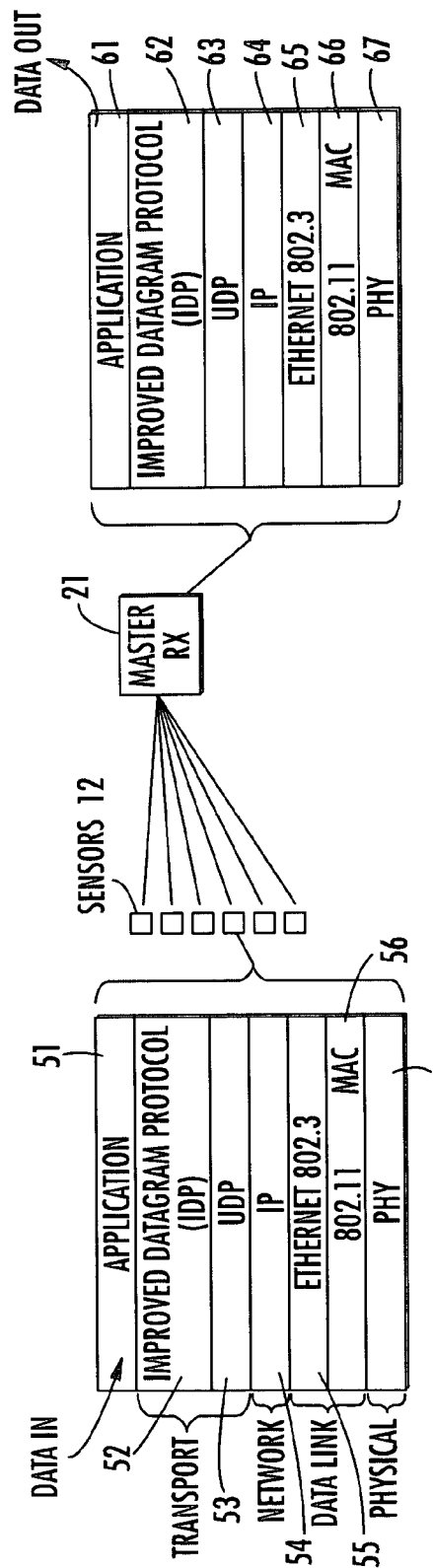
FIG. 5 shows the manner in which the wireless packetized data transport mechanism of the '467 application may be interfaced with a standard, layered-protocol wireless communication scheme.
Figure 10:
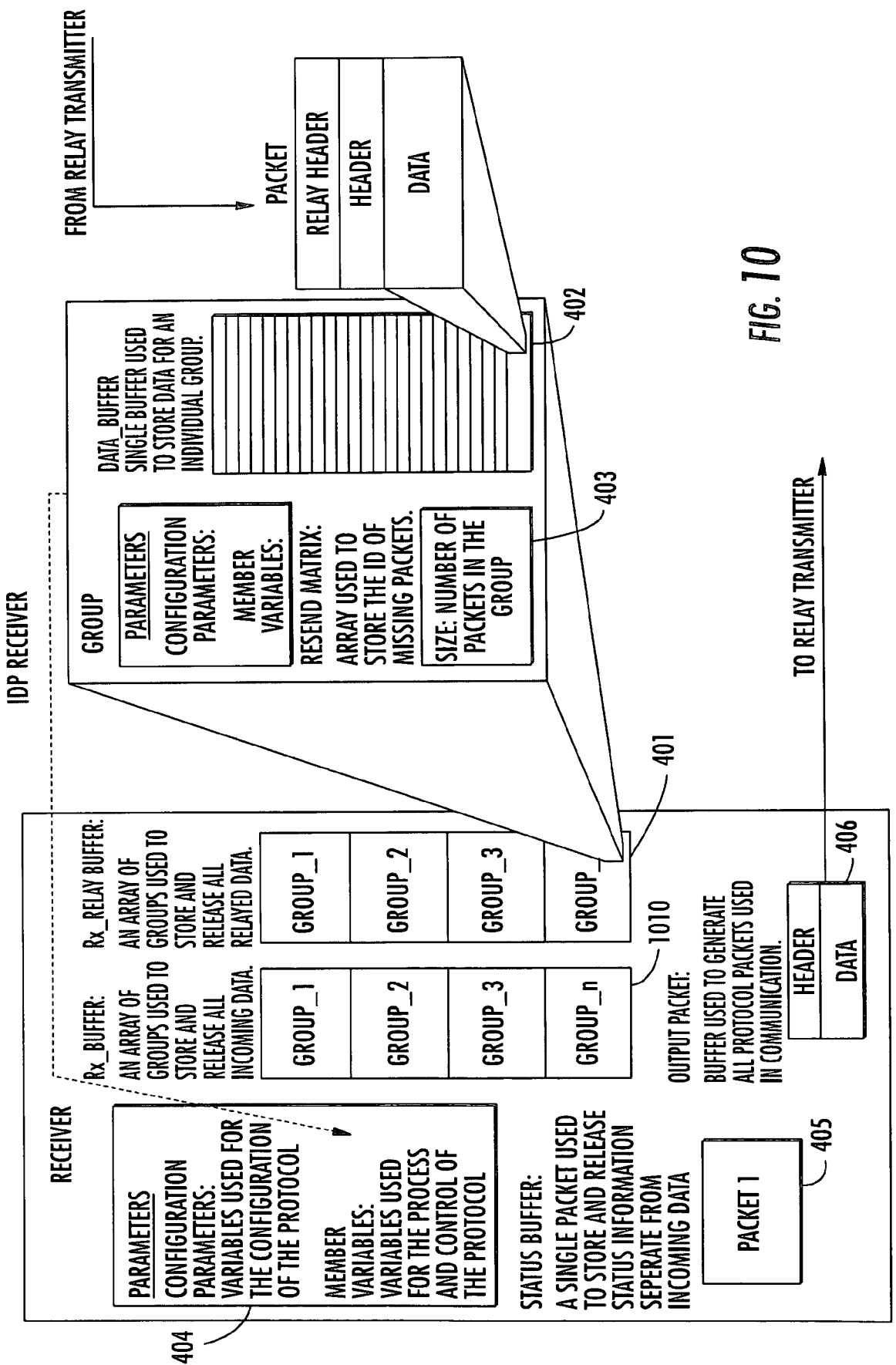
FIG. 10 diagrammatically illustrates a destination receiver packet-handling architecture which implements the data-recipient portion of the wireless packetized communication mechanism of the present invention.

Within the system of FIG. 9, the packet-handling architecture of the data-sourcing site 91 is identical to that shown in FIG. 3, so that no additional description is necessary. Similarly, the packet-handling architecture of the data-recipient site 93 is substantially identical to that shown in FIG. 4. In addition, the relay-based system of the present invention augments the data recipient site to include an additional data assembly buffer shown at 1010 in FIG. 10. Otherwise, the data-recipient site is effectively the same as that shown in FIG. 4. This additional buffer is used to store and eventually release all successfully received data. Namely, a data packet is successfully received from the relay site it will be loaded into its order of sequence location of the data assembly buffer. As will be described, the contents of the data assembly buffer are eventually released once complete data has been received.

Figure 11:
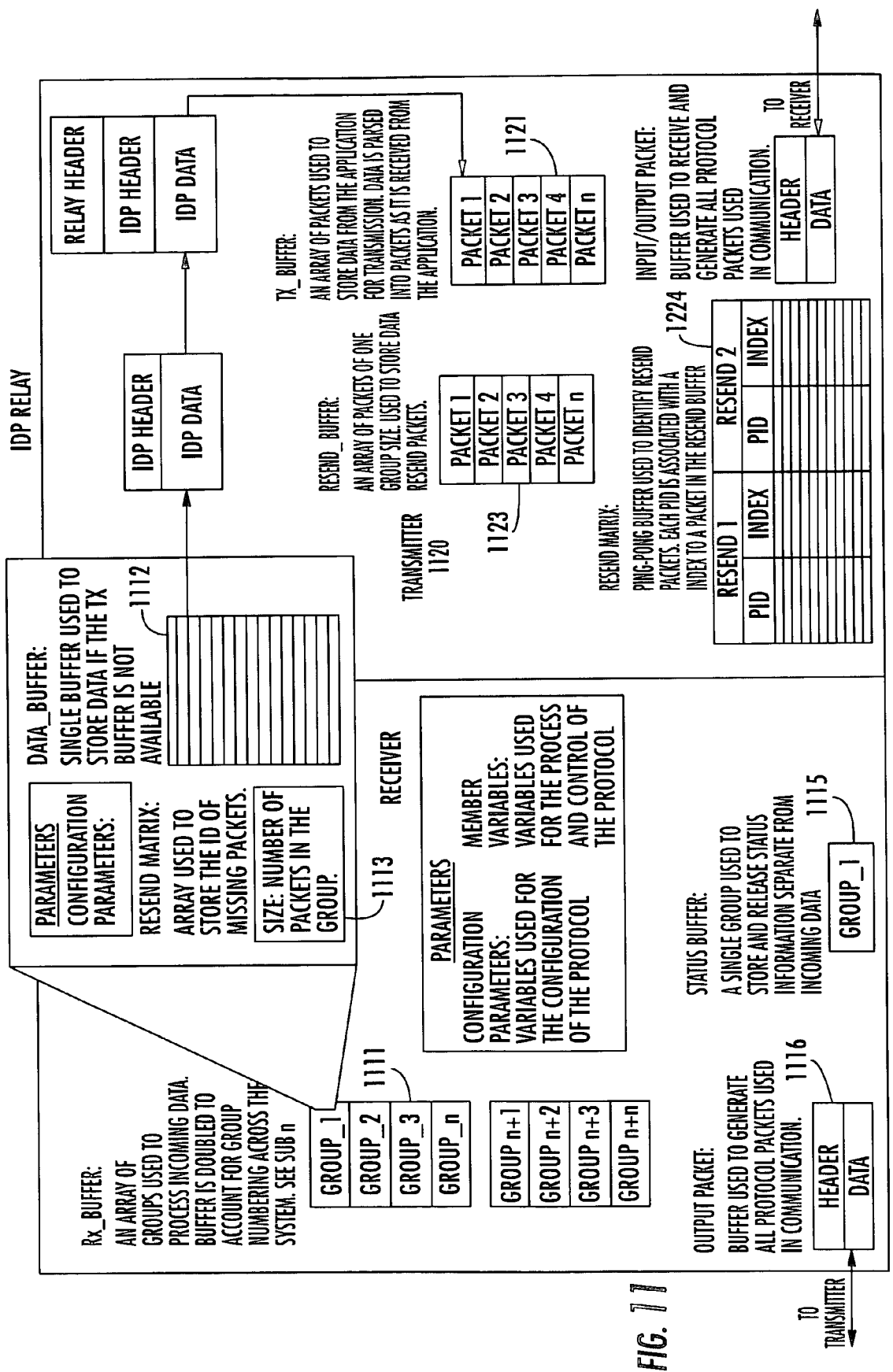
FIG. 11 diagrammatically illustrates the packet-handling architecture of a relay site transceiver.

FIG. 11 diagrammatically illustrates the packet-handling architecture of the relay site transceiver 95. As shown therein, the relay transceiver includes a receiver section 1110 for receiving data from the upstream data-source 91 (or an adjacent upstream relay) and a transmitter section 1120 for transmitting data it has received via the receiver section 1110 to the downstream data-recipient site 93 (or an adjacent downstream relay). The receiver section 1110 of the relay includes a receive buffer 1111, which is sized to accommodate multiple groups of data being received from an upstream source (e.g., transmitter site 91). The receive buffer is doubled to a ×2 capacity to account for group numbering across the system. A respective one of the group sections of the receive buffer 1111 includes a data buffer 1112 and an associated resend matrix 1113. Data buffer 1112 has a storage capacity sufficient to accommodate the currently configured number of packets that make up a single group.

The header portion of each packet (which may contain configuration parameters and member variables as shown at 1114) is stored in the data buffer, and is processed at the reception of the packets. The original header must be transmitted and is used by the destination to process and recombine the original data. Each relay will append its own header. When a relay receives a relayed packet it strips the sending relay's header and appends its own header but the IDP header is not stripped. This enables the data to be reconstituted at the destination. The resend matrix 1113 stores the identification of any missing packets of a received group. In addition to handling incoming packet group transmissions, the receiver further includes a status buffer 1115, which is a single group in length and is used to store either status or System (dependent upon the requested type) information separate from received data. An output packet buffer 1116 stores the contents of outgoing packets intended for the next upstream site (e.g., transmitter site 91 in the present reduced complexity example).

Within its transmitter section 1120, the relay includes an output or transmit buffer 1121, which stores a group or plurality of packets intended for transmission to the next downstream (e.g., data-recipient) site. Each packet contains a relay header field that is appended to the IDP header field, which is prepended to the data field. As described above a header field has configuration parameters as well as variables used to process and control handling of the packet. The data field includes data to be transmitted. An input/output buffer 1122 receives an interrogation packet or poll from a downstream site (e.g., the data-recipient site 93).

As described above, when an acknowledgement message is returned by the device, it identifies which packets of the group that were previously transmitted, if any, had not been successfully received. Rather than transmit the entire group of packets, the interrogated transceiver transmits only the missing packets. For this purpose, the transmit section of the relay comprises a resend buffer 1123 and an associated resend matrix 1124. The resend buffer 1123 has a storage capacity of one group. As noted earlier, the loss of all packets results in a retransmission of all the packets (Resend All). In such an instance, nothing is loaded in the resend buffer. The transmission of data is limited to one group of data, so that the largest number of Resends will be a group size of data. Also, as pointed out above, since only a group amount of data packets can be sent in a single transmission sequence, then the largest quantity of possible Resends is a group sized amount of packets.

As in the transceiver at the transmit site, the resend matrix 1124 of the relay's transmitter section 1120 comprises a dual or ping-pong buffer that stores the identification of packets that were not received by the downstream (data-recipient) transceiver during a previous transmission, as identified in the acknowledge message. Each packet identification (PID) is associated with an index to a packet in the resend buffer. Being configured as a ping-pong buffer allows the resend matrix 1124 to accommodate the identification of both missing packets of a previously transmitted group, as well as the identification of any packets missing from the new group.

Operation

As described briefly above, in order to maximize throughput from the data-sourcing site and the data-reception site, the relay mechanism of the present invention executes the limited acknowledged-based data transport mechanism detailed in the '467 application in the context of successive pairs of communication transceivers along the communication link. As noted above, for the reduced complexity example of FIG. 9, which uses only a single relay, there are two pairs of associated transceivers that exchange data gathering messages with one another via the limited acknowledged-based data transport mechanism detailed in the '467 application, and a flow diagram of which is shown in FIG. 6. The first pair involves data request and transport messages between the data-sourcing site 91 and the relay 95. The second pair involves data request and transport messages between the relay 95 and the data reception site 93.

The manner in which the limited acknowledged-based data transport mechanism of the '467 application may be employed in a relay-incorporating communication path will now be explained with referenced to FIGS. 12-34. In order to reduce the complexity of the description and illustration of the present example, the number of relays within the source-to-destination communication path has been limited to a single relay, and the number of packets per group and number of retries per packet have been set at three each.

For the single relay embodiment of the present example, this means that the size of the receive buffer (or the lowest number of groups) that may be allocated prior to reuse in that portion of the communication path from the transmitter site 91 to the relay site 95 is seven. This number is realized by taking into account the highest number of retries to which a packet may be subjected in the course of its being successfully transported from the transmit site 91, through the relay site 95 and eventually received at the destination site 93. With each transmission site allowing for three retries each there are a total of four tries at the upstream (transmit) site comprised of an original transmit plus three retries, and three retries at the relay site for a total of seven for the illustrated example.

This may be expressed generally as follows:

Buffer size=(Number of tries)*(number of relays+ 1)-number of relays.

For the present example, there is a single relay 95, so that the buffer size for the relay site is 4*(1+1)-1 or 7. Similarly, the buffer size for the destination site is 4*(0+1)-0 or 4. In order to avoid confusion, in the present example, transmissions from the transmit site 91 to the relay 93 will be identified with precursor group numbers of 1-7, while transmissions from the relay 93 to the destination site 95 will be identified with precursor group letters A-D.

FIG. 12 shows a source transmitter 110 having packets awaiting transmission in response to a poll from relay 120. In the present example, transmitter 110 is shown as having some arbitrary number of packets 1-27. If transmission and relay operations were perfect (namely, no losses), then only nine sequences of three packets per group would be required to send all 27 packets to a destination receiver 130. Because such a condition is straightforward it will not be described here. Instead, the present description will detail the occurrence of various losses in transmission, for which packet resends are required. For purposes of identification, transmissions from the source transmitter 110 to the relay 120 use precursor group numbers 1-7, while transmissions from the relay 120 to destination receiver 130 use precursor group letters A-D.

FIG. 13 shows the state of the relay 120 as a result of the source transmitter 110 having transmitted an initial group 1 of three packets, namely packets 1, 2 and 3, labelled in the Figure with a precursor group number (here the number 1) followed—by the packet number, and what was received for that packet. In the present example, for the first transmission sequence from the source transmitter 110, relay 120 did not successfully receive the first packet 1, but did receive the next to packets 2 and 3. This is represented in FIG. 13, by identifying the first packet 1 of the first group 1 as lost, by the notation 1-1,1 LOST. The next two packets were successfully received and are denoted as such as packets 1-2,2 and 1-3,3.

FIG. 14 shows the state of the destination receiver 130 as a result of the relay 120 having transmitted an initial group A of three packets to the destination receiver. As described above, the packets transmitted or relayed by the relay 120 to the destination receiver are based upon what the relay has to send when polled. In the present example, the relay's transmit buffer contains only the two packets that were successfully received from the source transmitter 110 during the first sequence therebetween, referenced above, namely packets 2 and 3. In addition, it will be assumed that the first packet in group A was lost. As a result, the first transmission sequence from relay 120 to destination receiver 130 is identified as containing packet A-1; 1-2,2 LOST, and packet A-2; 1-3,3. Packet 1 within the source transmitter 110 was not sent from the relay to the destination receiver within the first group A, since relay 120 has not yet successfully received this packet and therefore does currently have packet 1 to send.

FIG. 15 shows the state of the packet reassembly or release buffer 140 at the completion of the initial group A transmission for the state of the destination receiver shown in FIG. 14, described above. Since only packet 3 has been successfully transmitted and relayed from source transmitter 110 to the destination receiver 130 (packets 1 and 2 having been lost by relay 120 and destination receiver 130, respectively), the reassembly buffer 140 currently contains only packet 3, stored in the third entry location 140-3.

FIG. 16 shows the state of the relay 120 as a result of the source transmitter 110 having transmitted the next group of three packets following the initial transmission sequence described above. Since the first packet 1 of group 1 was lost, it will have been identified in the transmitter's resend buffer, so that it is sent as the first packet in the next group of three packets from the source. Thus, the second transmission sequence from the source 110 to the relay 120 contains the retransmitted packet 1 of group and the next two packets awaiting transmission, namely, packets 4 and 5—the first two packets of group 2. These respective packets are labelled in FIG. 16 as packets 1-1, 1 LOST, 2-1,4 and 2-1,5. Note that, once again, packet 1 has not been successfully received by the relay.

FIG. 17 shows the state of the destination receiver 130 as a result of the relay 120 having transmitted its next group of three packets to the destination receiver. Since the first packet of group A, i.e. original packet 2 of group 1, was lost, it will have been identified in the relay's resend buffer, so that it is sent as the first packet in the next group of three packets from the relay to the destination receiver as packet A-1; 1-2, 2 LOST. Thus, the second transmission sequence from the relay 120 to the destination receiver 130 contains the retransmitted packet 2 of group A and the next two packets awaiting transmission that make up the next group B, namely, packets 4 and 5 of group 2. These respective packets are labelled in FIG. 17 as packets A-1; 1-2, 2 LOST, B-1; 2-1,4 and B-2; 2-1,5. It is again to be noted that neither packet 1 nor packet 2 has yet been successfully received by the destination receiver.

FIG. 18 shows the state of the packet reassembly buffer 140 at the completion of the second group transmission for the state of the destination receiver shown in FIG. 17. Since packets 4 and 5 have been successfully transmitted and relayed from the source transmitter 110 to the destination receiver 130 (packets 1 and 2 having been lost at the relay 120 and the destination receiver 130, respectively), the reassembly buffer 140 now contains packets 3, 4 and 5 stored in its third, fourth and fifth entry locations 140-3, 140-4 and 140-5, respectively.

FIG. 19 shows the state of the relay 120 as a result of the source transmitter 110 having transmitted the next group of three packets following the second transmission sequence described above. Since the first packet 1 of group 1 was again lost, it will again be identified in the transmitter's resend buffer, so that it is sent as the first packet in the next group 3 of three packets from the source. Thus, the third transmission sequence from the source 110 to the relay 120 contains the retransmitted packet 1 of group 1, namely packet 1-1 followed by the next two packets awaiting transmission, namely, packet 6 of group 2 and packet 7 of group 3. These respective packets are labelled in FIG. 19 as packets 1-1, 1 LOST, 3-1,6 and 3-2,7. Note that, once again, packet 1 has not been successfully received by the relay.

FIG. 20 shows the state of the destination receiver 130 as a result of the relay 120 having transmitted its next group of three packets to the destination receiver. Since the first packet of group A, i.e. original packet 2 of group 1, was again lost, it will have been identified in the relay's resend buffer, so that it is sent as the first packet in the next group of three packets from the relay to the destination receiver as packet A-1; 1-2, 2 LOST. Thus, the third transmission sequence from the relay 120 to the destination receiver 130 contains the retransmitted packet 2 of group A and the next two packets awaiting transmission, namely, packet 6 of group 2 and packet 7 of group 3. These respective packets are labelled in FIG. 20 as packets A-1; 1-2, 2 LOST, C-1; 3-1,6 and C-2; 3-2,7. It is again to be noted that neither packet 1 nor packet 2 has yet been successfully received by the destination receiver.

FIG. 21 shows the state of the packet reassembly buffer 140 at the completion of the third transmission sequence for the state of the destination receiver shown in FIG. 20. Since packets 6 and 7 have been successfully transmitted and relayed from the source transmitter 110 to the destination receiver 130 (packets 1 and 2 currently still lost at the relay 120 and the destination receiver 130, respectively), the reassembly buffer 140 now contains packets 3-7.

FIG. 22 shows the state of the relay 120 as a result of the source transmitter 110 having transmitted the next group of three packets following the third transmission sequence described above. Again, since the first packet 1 of group 1 was lost it has been sent as the first packet in the next group 4 of three packets from the source transmitter. Thus, the fourth transmission sequence from the source 110 to the relay 120 contains the retransmitted packet 1 of group 1, namely packet 1-1 followed by the next two packets awaiting transmission, namely, packets 8 and 9 of group 4. These respective packets are labelled in FIG. 22 as packets 1-1, 1 FOUND, 4-1,8 and 4-2,9. Note that packet 1 has now been successfully received by the relay.

FIG. 23 shows the state of the destination receiver 130 as a result of the relay 120 having transmitted its next group of three packets to the destination receiver. Again, since the first packet of group A, i.e. original packet 2 of group 1, was lost at the previous relay-to-destination transmission, it will have been identified in the relay's resend buffer, so that it has been sent as the first packet in the next group of three packets from the relay to the destination receiver. However, it will now be assumed that latest transmission of packet 2 was successful, so that it is identified as packet A-1; 1-2, 2 FOUND. In addition, since the previously lost first packet 1 of group 1 was successfully received by the relay, as described above with reference to FIG. 22, that found packet will have been transmitted prior to the retransmitted packet 2. Thus, the fourth transmission sequence from the relay 120 to the destination receiver 130 contains packet 1 of group 1, followed by the retransmitted packet 2 of group A and the next packet in the relay awaiting transmission, namely, packet 8 of group 4. It will be further assumed that the receiver has failed to successfully receive the first packet, so that packet will be identified in the receiver as lost. Thus, the three respective packets received by the receiver for the fourth relay to receiver sequence are labelled in FIG. 23 as packets A-1; 1-2, 2 FOUND, D-1; 1-1, 1 LOST and D-2; 4-1,8.

FIG. 24 shows the state of the packet reassembly buffer 140 at the completion of the fourth transmission sequence for the state of the destination receiver shown in FIG. 23. Since packets 2 and 8 have been successfully transmitted and relayed from the source transmitter 110 to the destination receiver 130 (packet 1 currently being lost at the destination receiver 130) the reassembly buffer 140 now contains packets 2-8.

FIG. 25 shows the state of the relay 120 as a result of the source transmitter 110 having transmitted the next group of three packets following the fourth transmission sequence described above. Since the first packet 1 of group 1 was successfully received by the relay during the previous sequence, and there are no other resends awaiting transmission by the source transmitter, the fifth transmission sequence from the source 110 to the relay 120 contains the next three packets awaiting transmission, namely packets 10-12 of group 5. These respective packets are labelled in FIG. 25 as packets 5-1,10, 5-2,11 and 5-3, 12.

FIG. 26 shows the state of the destination receiver 130 as a result of the relay 120 having transmitted its next group of three packets to the destination receiver. Since the first packet of group D, i.e. original packet 1 of group 1, was lost at the previous relay-to-destination transmission, it will have been identified in the relay's resend buffer, so that it has been sent as the first packet in the next group of three packets from the relay to the destination receiver. Thus, the fifth transmission sequence from the relay 120 to the destination receiver 130 contains packet 1 of group 1, followed by the next two packets in the relay awaiting transmission, namely, packet 8 of group 4 and packet 10 of group 5. It will again be assumed that the receiver has failed to successfully receive the first packet, so that packet will be identified in the receiver as lost. Since the relay uses only four groups to transmit packets, the packet sequence identification rolls over from group D, back to group A. As pointed out above, since the number of groups takes into account the maximum number of retries per packet entry (three in the present example) there is no possibility of a reuse of group A, after four sequences. Thus, the three respective packets received by the receiver for the fifth relay to receiver sequence are labelled in FIG. 26 as packets D-1; 1-1, 1 LOST, A-1; 4-2,9, and A-2; 5-1,10.

FIG. 27 shows the state of the packet reassembly buffer 140 at the completion of the fifth transmission sequence for the state of the destination receiver shown in FIG. 26. Since packets 9 and 10 have been successfully transmitted and relayed from the source transmitter 110 to the destination receiver 130 (packet 1 currently still being lost at the destination receiver 130) the reassembly buffer 140 now contains packets 2-10.

FIG. 28 shows the state of the relay 120 as a result of the source transmitter 110 having transmitted the next group of three packets following the fifth transmission sequence described above. Since there are no resends awaiting transmission by the source transmitter, the sixth transmission sequence from the source 110 to the relay 120 contains the next three packets awaiting transmission, namely packets 13-15 of group 6. These respective packets are labelled in FIG. 28 as packets 6-1,13, 6-2,14 and 6-3, 15.

FIG. 29 shows the state of the destination receiver 130 as a result of the relay 120 having transmitted its next group of three packets to the destination receiver. Since the first packet of group D, i.e. original packet 1 of group 1, was lost at the previous relay-to-destination transmission, it will have been identified in the relay's resend buffer, so that it has been sent as the first packet in the next group of three packets from the relay to the destination receiver. Thus, the sixth transmission sequence from the relay 120 to the destination receiver 130 contains packet 1 of group 1, followed by the next two packets in the relay awaiting transmission, namely, packets 11 and 12 of group 5. It will again be assumed that the receiver has failed to successfully receive the first packet, so that packet will be identified in the receiver as lost. The three respective packets received by the receiver for the sixth relay to receiver sequence are labelled in FIG. 29 as packets D-1; 1-1, 1 LOST, B-1, 5-2,11, and B-2; 5-3,12.

FIG. 30 shows the state of the packet reassembly buffer 140 at the completion of the sixth transmission sequence for the state of the destination receiver shown in FIG. 29. Since packets 11 and 12 have been successfully transmitted and relayed from the source transmitter 110 to the destination receiver 130 (packet 1 currently still being lost at the destination receiver 130) the reassembly buffer 140 now contains packets 2-12.

Figure 31:
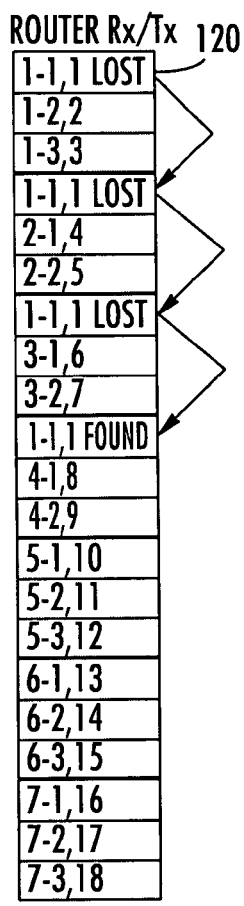

FIG. 31 shows the state of the relay 120 as a result of the source transmitter 110 having transmitted the next group of three packets following the fifth transmission sequence described above. Since there are no resends awaiting transmission by the source transmitter, the sixth transmission sequence from the source 110 to the relay 120 contains the next three packets awaiting transmission, namely packets 16-18 of group 7. These respective packets are labelled in FIG. 31 as packets 7-1,16, 7-2,17 and 7-3, 18.

Figure 32:
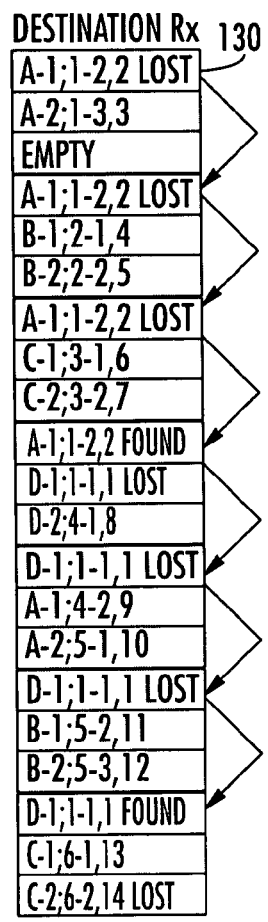

FIG. 32 shows the state of the destination receiver 130 as a result of the relay 120 having transmitted its next group of three packets to the destination receiver. Since the first packet of group D, i.e. original packet 1 of group 1, was lost at the previous relay-to-destination transmission, it will have been identified in the relay's resend buffer, so that it will have been sent as the first packet in the next group of three packets from the relay to the destination receiver. Thus, the seventh transmission sequence from the relay 120 to the destination receiver 130 contains packet 1 of group 1, followed by the next two packets in the relay awaiting transmission, namely, packets 13 and 14 of group 6. It will be assumed that the receiver has successfully received the first packet, but not packet 14, so that packet 1 will be identified in the receiver as found, while packet 14 will be identified as lost. The three respective packets received by the receiver for the seventh relay to receiver sequence are labelled in FIG. 32 as packets D-1; 1-1, 1 FOUND, C-1, 6-1,13, and C-2; 6-2,14 LOST.

Figure 33:
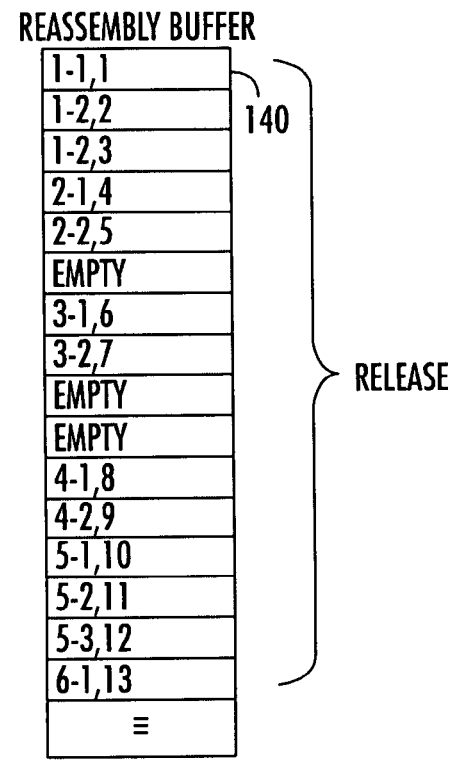

FIG. 33 shows the state of the packet reassembly buffer 140 at the completion of the seventh transmission sequence for the state of the destination receiver shown in FIG. 32. Packets 1 and 13 have now been successfully transmitted and relayed from the source transmitter 110 to the destination receiver 130. The destination receiver's reassembly buffer 140 contains an entire continuous set of packets (1-13). Packets 1-12 complete groups 1-5. Since they are complete groups, then they can be released as complete, but packet 13 is in group 6 and it is incomplete. Packet 13 will not be released until the missing packets for group 6 are received and it is complete.

In addition to the foregoing number of retries-based retransmission criteria, the present invention may optionally incorporate a time out mechanism. In accordance with this procedure a sequence number is appended to the header by the transmitter. The destination receiver (not an intervening relay) sets a timer for each new group it receives. If a group has not been completed (resends present) when the timer expires, the destination receiver will fill all remaining packets in the reassembly buffer as incomplete, and then release that portion of the reassembly buffer up to the next incomplete group in the buffer or the end of the buffer. It may be noted that the process of releasing data from the input buffer is termed 'flushing' the buffer. Then the sequence number for each released group is incremented. If a received packet has a sequence number lower than the current sequence number, that packet is ignored and discarded. In effect, since the packet will not be identified in the Data-Ack for the group, the sender will presumed it was received and it will be purged.

As will be appreciated from the foregoing description, the limited acknowledgement based signal transport functionality employed by the communication system described in the above-referenced '467 application may be readily modified for use in communication system that contains one or more relay sites interposed between an upstream-most data-sourcing site and a downstream-most data-recipient site. By applying the data communication exchange protocol of the '467 application to each successive pair of transceivers distributed along the communication path through one or more relays between a transmitter site and a destination site, the present invention is able to prevent the occurrence bottlenecks and enhance throughput.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of conducting wireless packetized digital data communications between a data sourcing site and a data reception site, geographically remote with respect to one another, said method comprising:

(a) providing a communication path between said data sourcing site and said data reception site, said communication path including at least one relay therebetween, such that said communication path, said sourcing site, and said reception site contain at least three successive transceiver devices, wherein each pair of immediately successive transceiver devices includes a data transmission device and a data reception device;

(b) selectively wirelessly transmitting a polling message to said data transmission device from said data reception device;

(c) in response to receipt of said polling message, wirelessly transmitting, from said data transmission device to said data reception device, a poll acknowledgement message that is representative of whether said data transmission device has data to send and the quantity of data to be sent;

(d) in response to receipt of said poll acknowledgement message indicating that said data transmission device has data to send, wirelessly transmitting, from said data reception device to said data transmission device, a data request message;

(e) in response to receipt of said data request message, wirelessly transmitting, from said data transmission device to said data reception device, a data message containing a plurality of data packets;

(f) in response to receipt of said data message at said data reception device, storing data contained in data packets of said data message, storing data contained in a respective group of data packets in an associated data buffer of a group storage section of a memory of said data reception device, and storing information representative of any data packets missing from said data message in a resend buffer of said group storage section of said memory of said data reception device;

(g) wirelessly transmitting from said data reception device to said data transmission device, a data acknowledgement message that includes said information representative of any data packets missing from said data message, and assembling said data acknowledgement message in accordance with the contents of said resend buffer of said group storage section of said memory of said data reception device; and (h) subsequent to receipt of said data acknowledgement message, wirelessly transmitting, from said data transmission device to said data reception device, at least one further data message containing data packets missing from said data message transmitted in step (e).

2. The method according to claim 1, wherein step (g) comprises wirelessly transmitting from said data reception device to said data transmission device, a data acknowledgement message that requests said data transmission device to transmit all packets except for specifically identified packets.

3. The method according to claim 2, wherein step (h) includes storing, in a resend packet buffer, those data packets that were identified in said data acknowledgement message as missing from said data message transmitted in step (e), and assembling said at least one further data message for wireless transmission to said data reception device in accordance with the contents of said resend packet buffer.

4. The method according to claim 1, wherein step (g) comprises wirelessly transmitting from said data reception device to said data transmission device, a data acknowledgement message that requests said data transmission device to retransmit only specifically identified packets and fill the remainder of the data message with new packets.

5. The method according to claim 1, wherein step (g) comprises wirelessly transmitting from said data reception device to said data transmission device, a data acknowledgement message that requests said data transmission device to retransmit all packets of the last data message.

6. The method according to claim 1, wherein said data acknowledgement message transmitted in step (g) includes information that indicates whether said at least one further data message is to be immediately transmitted, and wherein step (h) comprises, in the absence of information indicating that said at least one further data message is to be immediately transmitted, waiting until receipt of a further poll message and a further data request message before wirelessly transmitting, from said data transmission device to said data reception device, said at least one further data message containing said data packets missing from said data message transmitted in step (e).

7. The method according to claim 1, wherein said data acknowledgement message transmitted in step (g) includes information that indicates whether said at least one further data message is to be immediately transmitted, and wherein step (h) comprises, in response to information indicating that said at least one further data message is to be immediately transmitted, wirelessly transmitting, from said data transmission device to said data reception device, said at least one further data message containing said data packets missing from said data message transmitted in step (e).

8. A method of conducting wireless packetized digital data communications between a data sourcing site and a data reception site, geographically remote with respect to one another, said method comprising:

(a) providing a communication path between said data sourcing site and said data reception site, said communication path including at least one relay therebetween, such that said communication path contains at least three successive transceiver devices, wherein each pair of immediately successive transceiver devices includes a data transmission device and a data reception device;

(b) selectively wirelessly transmitting a polling message to said data transmission device from said data reception device;

(c) in response to receipt of said polling message, wirelessly transmitting, from said data transmission device to said data reception device, a poll acknowledgement message that is representative of whether said data transmission device has data to send and the quantity of data to be sent;

(d) in response to receipt of said poll acknowledgement message indicating that said data transmission device has data to send, wirelessly transmitting, from said data reception device to said data transmission device, a data request message;

(e) in response to receipt of said data request message, wirelessly transmitting, from said data transmission device to said data reception device, a data message containing a plurality of data packets;

(f) in response to receipt of said data message at said data reception device, storing data contained in data packets of said data message, storing information representative of any data packets missing from said data message by at least storing data contained in a respective group of data packets in an associated data buffer of a group storage section of a memory of said data reception device, and storing said information representative of any data packets missing from said data message in a resend buffer of said group storage section of said memory of said data reception device;

(g) wirelessly transmitting from said data reception device to said data transmission device, a data acknowledgement message that includes said information representative of any data packets missing from said data message by at least assembling said data acknowledgement message in accordance with the contents of said resend buffer of said group storage section of said memory of said data reception device; and (h) subsequent to receipt of said data acknowledgement message, wirelessly transmitting, from said data transmission device to said data reception device, at least one further data message containing data packets missing from said data message transmitted in step (e).

9. The method according to claim 8, wherein step (g) comprises wirelessly transmitting from said data reception device to said data transmission device, a data acknowledgement message that requests said data transmission device to transmit all packets except for specifically identified packets.

10. The method according to claim 8, wherein step (g) comprises wirelessly transmitting from said data reception device to said data transmission device, a data acknowledgement message that requests said data transmission device to retransmit only specifically identified packets and fill the remainder of the data message with new packets.

11. A method of conducting wireless packetized digital data communications between a data sourcing site and a data reception site, geographically remote with respect to one another, said method comprising:

(a) providing a communication path between said data sourcing site and said data reception site, said communication path including at least one relay therebetween, such that said communication path, said sourcing site, and said reception site contain at least three successive transceiver devices, wherein each pair of immediately successive transceiver devices includes a data transmission device and a data reception device;

(b) selectively wirelessly transmitting a polling message to said data transmission device from said data reception device;

(c) in response to receipt of said polling message, wirelessly transmitting, from said data transmission device to said data reception device, a poll acknowledgement message that is representative of whether said data transmission device has data to send and the quantity of data to be sent;

(d) in response to receipt of said poll acknowledgement message indicating that said data transmission device has data to send, wirelessly transmitting, from said data reception device to said data transmission device, a data request message;

(e) in response to receipt of said data request message, wirelessly transmitting, from said data transmission device to said data reception device, a data message containing a plurality of data packets;

(f) in response to receipt of said data message at said data reception device, storing data contained in data packets of said data message, and storing information representative of any data packets missing from said data message;

(g) wirelessly transmitting from said data reception device to said data transmission device, a data acknowledgement message that includes said information representative of any data packets missing from said data message; and (h) subsequent to receipt of said data acknowledgement message, wirelessly transmitting, from said data transmission device to said data reception device, at least one further data message containing data packets missing from said data message transmitted in step (e), said data acknowledgement message transmitted in step (g) including information that indicates whether said at least one further data message is to be immediately transmitted, and in the absence of information indicating that said at least one further data message is to be immediately transmitted, waiting until receipt of a further poll message and a further data request message before wirelessly transmitting, from said data transmission device to said data reception device, said at least one further data message containing said data packets missing from said data message transmitted in step (e).

12. The method according to claim 11, wherein step (f) comprises storing data contained in a respective group of data packets in an associated data buffer of a group storage section of a memory of said data reception device, and storing said information representative of any data packets missing from said data message in a resend buffer of said group storage section of said memory of said data reception device.

13. The method according to claim 12, wherein step (g) comprises assembling said data acknowledgement message in accordance with the contents of said resend buffer of said group storage section of said memory of said data reception device.

14. A method of conducting wireless packetized digital data communications between a data sourcing site and a data reception site, geographically remote with respect to one another, said method comprising:

(a) providing a communication path between said data sourcing site and said data reception site, said communication path including at least one relay therebetween, such that said communication path, said sourcing site, and said reception site contain at least three successive transceiver devices, wherein each pair of immediately successive transceiver devices includes a data transmission device and a data reception device;

(b) selectively wirelessly transmitting a polling message to said data transmission device from said data reception device;

(c) in response to receipt of said polling message, wirelessly transmitting, from said data transmission device to said data reception device, a poll acknowledgement message that is representative of whether said data transmission device has data to send and the quantity of data to be sent;

(d) in response to receipt of said poll acknowledgement message indicating that said data transmission device has data to send, wirelessly transmitting, from said data reception device to said data transmission device, a data request message;

(e) in response to receipt of said data request message, wirelessly transmitting, from said data transmission device to said data reception device, a data message containing a plurality of data packets;

(f) in response to receipt of said data message at said data reception device, storing data contained in data packets of said data message, and storing information representative of any data packets missing from said data message;

(g) wirelessly transmitting from said data reception device to said data transmission device, a data acknowledgement message that includes said information representative of any data packets missing from said data message; and (h) subsequent to receipt of said data acknowledgement message, wirelessly transmitting, from said data transmission device to said data reception device, at least one further data message containing data packets missing from said data message transmitted in step (e), said data acknowledgement message transmitted in step (g) including information that indicates whether said at least one further data message is to be immediately transmitted, and in response to information indicating that said at least one further data message is to be immediately transmitted, wirelessly transmitting, from said data transmission device to said data reception device, said at least one further data message containing said data packets missing from said data message transmitted in step (e).

15. The method according to claim 14, wherein step (f) comprises storing data contained in a respective group of data packets in an associated data buffer of a group storage section of a memory of said data reception device, and storing said information representative of any data packets missing from said data message in a resend buffer of said group storage section of said memory of said data reception device.

16. The method according to claim 15, wherein step (g) comprises assembling said data acknowledgement message in accordance with the contents of said resend buffer of said group storage section of said memory of said data reception device.

* * * * *